(12) United States Patent
Zhang et al.

(10) Patent No.: US 11,613,919 B2
(45) Date of Patent: Mar. 28, 2023

(54) LOCKING APPARATUS

(71) Applicant: Ningbo Hongdu Model Plastics Co., Ltd., Ningbo (CN)

(72) Inventors: Jinchun Zhang, Ningbo (CN); Xudong Gong, Ningbo (CN); Chengchao Zhang, Ningbo (CN)

(73) Assignee: NINGBO HONGDU MODEL PLASTICS CO., LTD., Ningbo (CN)

( * ) Notice: Subject to any disclaimer, the term of this patent is extended or adjusted under 35 U.S.C. 154(b) by 769 days.

(21) Appl. No.: 16/620,718

(22) PCT Filed: Jun. 7, 2018

(86) PCT No.: PCT/IB2018/054084
§ 371 (c)(1),
(2) Date: Dec. 9, 2019

(87) PCT Pub. No.: WO2018/224994
PCT Pub. Date: Dec. 13, 2018

(65) Prior Publication Data
US 2020/0165847 A1 May 28, 2020

(30) Foreign Application Priority Data

Jun. 9, 2017 (CN) .......................... 201720666684.8

(51) Int. Cl.
E05C 9/04 (2006.01)
A01K 1/02 (2006.01)
(Continued)

(52) U.S. Cl.
CPC ............ *E05C 9/042* (2013.01); *A01K 1/0245* (2013.01); *E05B 1/003* (2013.01); *E05B 9/02* (2013.01); *E05C 9/048* (2013.01); *E05Y 2900/60* (2013.01)

(58) Field of Classification Search
CPC . E05C 9/042; E05C 9/048; E05C 9/00; E05C 9/04; E05C 9/10; A01K 1/0245;
(Continued)

(56) References Cited

U.S. PATENT DOCUMENTS 6,182,611 B1 * 2/2001 Marchioro ........... A01K 1/0245
D30/114
6,783,162 B1 * 8/2004 Harper ................. A01K 1/0245
292/336.3
9,277,729 B1 3/2016 Wright

FOREIGN PATENT DOCUMENTS

CN 202788346 U 3/2013
CN 204060236 U 12/2014
(Continued)

Primary Examiner — Christine M Mills
Assistant Examiner — Yahya Sidky
(74) Attorney, Agent, or Firm — Muncy, Geissler, Olds & Lowe, P.C.

(57) ABSTRACT

A locking apparatus for a pet cage is disclosed. The locking apparatus comprises a turntable rotatable about a central axis of rotation; at least one elongate metal lock bar, where elongate metal lock bar is configured to extend along a radial line originating from the axis of rotation of the turntable and a connecting member for operably connecting the elongate metal lock bar and the turntable. The connecting member comprises a forwardly extending portion for receiving a front section of the elongate metal lock bar and fixing a retained end of the elongate metal lock bar to the connecting member and a rearward extending portion which extends parallel with and is outwardly offset from the forwardly extending portion. The connecting member also includes a linear conversion mechanism arranged between the turntable and the rearward extending portion of the connecting member; the linear conversion mechanism configured to convert rotation of the turntable about the axis of rotation to linear movement of the connecting member in the same (Continued)

direction as a longitudinal direction of the elongate metal lock bar.

9 Claims, 16 Drawing Sheets

(51) Int. Cl.
*E05B 1/00* (2006.01)
*E05B 9/02* (2006.01)

(58) Field of Classification Search
CPC .......... A01K 1/03; A01K 1/032; A01K 1/033; A01K 1/034; E05B 1/003; E05B 9/02; E05B 15/04; E05B 55/00; E05B 83/30; E05Y 2900/60; Y10T 292/0834; Y10T 292/0836; Y10T 292/084; Y10T 292/0846; Y10T 292/0969; Y10T 292/097; Y10T 292/0977; Y10T 292/0997
See application file for complete search history.

(56) References Cited

FOREIGN PATENT DOCUMENTS

| | | |
|---|---|---|
| CN | 205143139 U | 4/2016 |
| CN | 106508697 A | 3/2017 |
| CN | 107091022 A | 8/2017 |
| CN | 206917463 U | 1/2018 |
| WO | WO 2012/132546 A1 | 10/2012 |

\* cited by examiner

LOCKING APPARATUS

PRIORITY DOCUMENTS

The present application claims priority from Chinese Utility Model No. 201720666684.8 titled "Pet Cage Locking Apparatus and Pet Cage" and filed on 9 Jun. 2017, the content of which is hereby incorporated by reference in its entirety.

TECHNICAL FIELD

The present disclosure relates to a cage for confining a pet or for allowing the pet to rest. In a particular form, the present disclosure relates to a locking apparatus for a pet cage.

BACKGROUND

With the improvement of living standards, people's demand for pets has gradually increased and ownership of pets has become a part of our lives.

A pet cage can be used as a resting place for pets and also for transporting pets on airplanes, trains or cars. A common pet cage includes a main cage body and a door body mounted on the main cage body. In order to be able to observe the pets in the cage and for safety considerations, the door body is generally composed of a criss-cross grid of metal strips which includes a longitudinal shaft mounted on one side of the door body that is pivotally connected to the cage main body and a locking arrangement that is mounted on the other side of the door body.

The locking arrangement can include two elongate metal lock bars and a push type operation switch. Under the action of a push type operation switch, the two elongate metal lock bars can be inserted into or retracted from respective apertures located on the main cage body. The door body is locked when the elongate metal lock bars are inserted into the aperture of the main cage body and correspondingly the door body is opened when the elongate metal lock bars are retracted these apertures. The locking arrangement of the above structure only locks the door body to the main cage body in a longitudinal direction and the impact-resistance and safety of the door body is insufficient. The above-mentioned push type operation switch drives the metal lock bar by being manually pressed and is not very ergonomic in operation.

Chinese Patent Application Publication No CN105064820A discloses a locking arrangement for a pet cage comprising a turntable, a fixed metal base plate and four linear metal lock bars facing in different directions, in which non-intersecting linear tracks for allowing the linear metal bars to move are provided on the periphery of the fixed metal base. The inner end of the linear metal lock bar is provided with a force receiving end, and the periphery of the turntable is provided with an elliptical hole for allowing the force receiving end of each linear metal lock bar to move. In this arrangement, the centre of the turntable serves as the centre of rotation and the turntable is rotatable in forward and reverse directions resulting in the linear metal lock bar moving back and forth within the linear track, and at the same time, the force receiving end of the linear metal lock bar moving back and forth in the elliptical hole.

By rotating the turntable, the locking arrangement of such a structure can achieve the simultaneous linear movement of the four metal lock bars resulting in the convenient locking or opening of the door body. Moreover, because the metal locking bar is linear and its movement is also in a linear form, a locking aperture on the cage may have a diameter equivalent to that of the metal lock bar enhancing the structural reliability and stability of the locking arrangement. However, when this rotational opening and closing arrangement is applied to only two metal lock bars, the overall structure of the locking arrangement may become unstable because as the metal lock bar is offset from the centre position of the fixed base plate.

It is against this background that the locking arrangement of the present disclosure has been developed.

SUMMARY

In one aspect, the present disclosure provides a locking apparatus for a pet cage, comprising:
 a turntable rotatable about a central axis of rotation;
 at least one elongate metal lock bar, said elongate metal lock bar configured to extend along a radial line originating from the axis of rotation of the turntable;
 a connecting member for operably connecting the elongate metal lock bar and the turntable; the connecting member comprising:
  a forwardly extending portion for receiving a front section of the elongate metal lock bar and fixing a retained end of the elongate metal lock bar to the connecting member; and
  a rearward extending portion which extends parallel with and is outwardly offset from the forwardly extending portion; and
  a linear conversion mechanism arranged between the turntable and the rearward extending portion of the connecting member; the linear conversion mechanism configured to convert rotation of the turntable about the axis of rotation to linear movement of the connecting member in the same direction as a longitudinal direction of the elongate metal lock bar.

In another form, the linear conversion mechanism includes:
 a first circular projection located on an upper surface of the rearward extending portion, and
 an elongate slot located eccentrically on said turntable, wherein the circular projection is received within the elongate slot.

In another form, the linear conversion mechanism includes:
 a transverse groove located on the rearward extending portion and extending perpendicularly to a longitudinal direction of the rearward extending portion; and
 a second circular projection located at an eccentric position on said turntable, wherein the second circular projection is located in said transverse groove.

In another form, the locking apparatus further comprises a generally rectangular metal base plate for mounting on a door body of a pet cage, wherein said elongate metal lock bar extends over an upper surface of the metal base plate from a central position on a side of the metal base plate and said connecting member reciprocates linearly on said metal base plate.

In another form, the metal base plate comprises two side abutment portions for limiting sideways movement of said connecting member, wherein said side abutment portions are formed by stamping the metal base plate.

In another form, the metal base plate comprises first and second end abutment portions for limiting linear movement of said rearward extending portion on the metal base plate, wherein the first end abutment portion is located at a front end of said rearward extending portion and the second end abutment portion is located at a rear end of said rearward extending portion, wherein said first and second end abutment portions are formed by stamping of the metal base plate.

In another form, the forwardly extending projection of the connecting member comprises a first channel for receiving the elongate metal lock bar, the first channel located on a lower side of the forwardly extending portion, and wherein the first channel comprises limit ribs located on side walls of the first channel, the limit ribs configured for limiting the up-and-down movement of the elongate metal lock bar, and wherein the forwardly extending projection further includes a through hole located on an inner end of the forwardly extending projection, the through hole configured to receive and fix the retained end of the elongate metal lock bar that has been bent at 90 degrees with respect to the remaining elongate metal lock bar.

In another form, the rearward extending portion comprises an open-ended U-shaped channel for receiving a spring, the U-shaped channel closed at an opposed end to provide a stop against a received end of the spring and wherein a free end of the spring abuts a second end abutment portion located on the metal base plate, the second end abutment portion configured to match the shape of the U-shaped channel so that when the connecting member moves rearward the second end abutment portion compresses the spring and is received into the U-shaped channel and the spring provides a return force to urge the connecting member forward.

In another form, a lower end of said turntable is rotatably mounted on said metal base plate; a housing is mounted on said metal base plate; said metal base plate and the housing are fixed together by a snap fit arrangement, and a button or knob for driving said turntable to rotate is provided on a centre of said housing.

In a second aspect, the present disclosure provides a pet cage, comprising a cage body, said cage comprising a door body formed by grid metal strips, the door body including a locking apparatus according to a first aspect of the disclosure to lock the door body to the cage body.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Illustrative embodiments of the present disclosure will be described in detail below with reference to the accompanying drawings. Those skilled in the art will appreciate that these descriptions are only illustrative and exemplary, and should not be construed to define the protection scope of the present disclosure.

For ease of description, the locking apparatus of the present disclosure is described below in its usual assembled position as shown in the accompanying drawings and terms such as front, rear, upper, lower, horizontal, longitudinal etc., may be used with reference to this usual position. However, the locking apparatus may be manufactured, transported, sold, or used in orientations other than that described and depicted in the specification.

Figure 1:
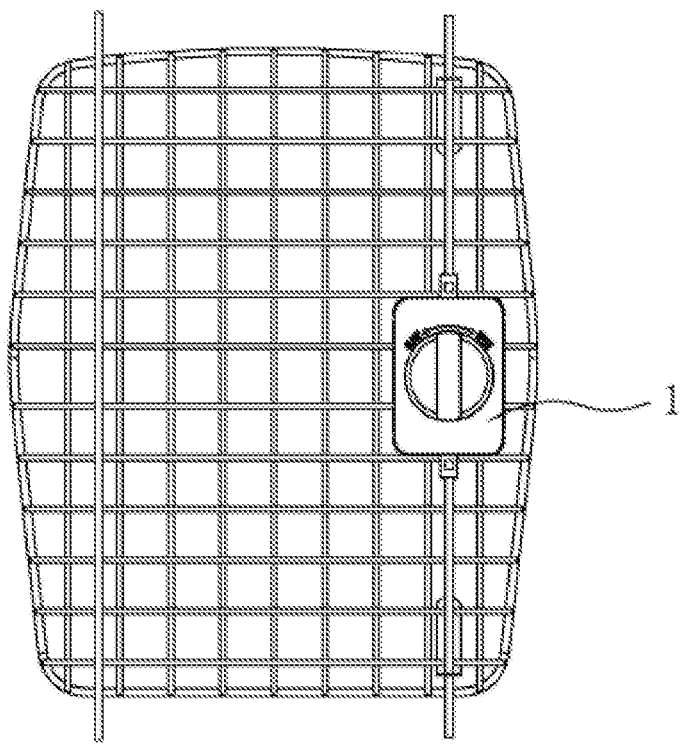
FIG. 1 is a structural schematic view of a pet cage including a locking apparatus in accordance with an illustrative embodiment.

As shown in FIG. 1, a pet cage includes a cage body, the cage includes a door body made of grid metal strips, and a pet cage locking apparatus 1 is mounted on the door body.

First Embodiment

Figure 2:
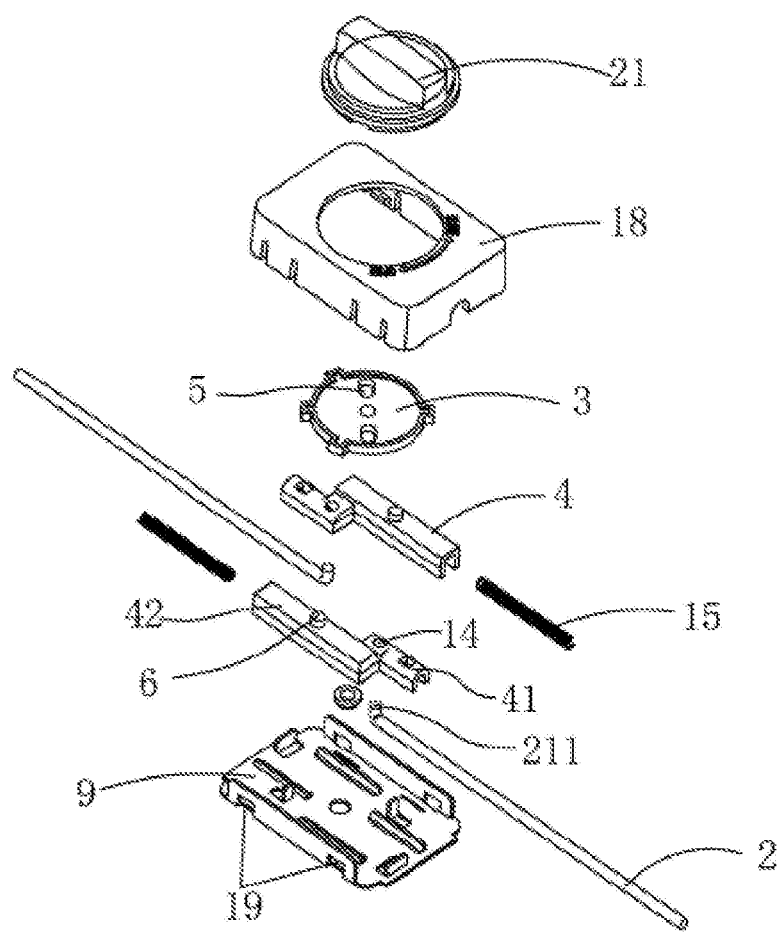
FIG. 2 is a disassembled view of a pet cage locking apparatus of the present utility model.

As shown in FIG. 2, the locking apparatus 1 includes two elongate metal lock bars 2, a turntable 3 that is rotatable about an axis of rotation and a connecting member 4 is provided which operably connects the elongate metal lock bar 2 and the turntable 3. The connecting member 4 includes a forwardly extending portion 41 and a rearward extending portion 42 which extends parallel with and is outwardly offset from the forwardly extending portion 41. The forwardly extending portion 41 is configured to receive a front section of the elongate metal lock bar 2 and fix a retained end of the elongate metal lock bar 2. The elongate metal lock bar 2 is configured to extend along a radial line originating from the axis of rotation of the turntable 3, that is, the extension line of the elongate metal bar would passes through a mirror plane of the turntable, the mirror plane of the turntable 3 being perpendicular with a plane where the turntable is located and extending through the axis of rotation. A linear conversion mechanism is arranged between the turntable 3 and the rearward extending portion 42 of the connecting member 5. When the turntable 3 rotates around the axis of rotation, the linear conversion mechanism is configured to convert rotation of turntable 3 to linear movement of the connecting member 4 in the same direction as a longitudinal direction of the elongate metal lock bar 2.

Figure 3:
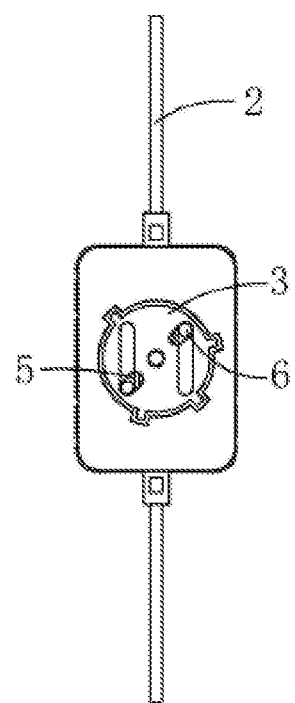
FIG. 3 is a first schematic view of a linear movement of a elongate metal lock bar when a turntable is rotated according to a first embodiment.
Figure 4:
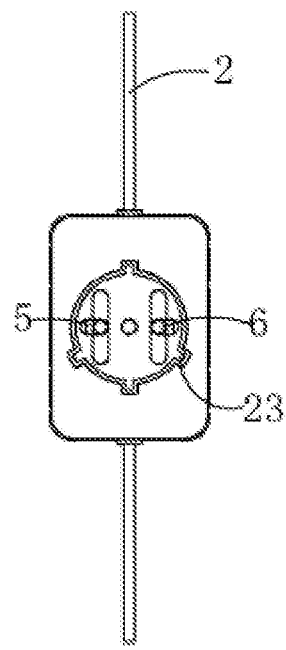
FIG. 4 is a second schematic view of the linear movement of the elongate metal lock bar when the turntable is rotated according to the first embodiment.
Figure 5:
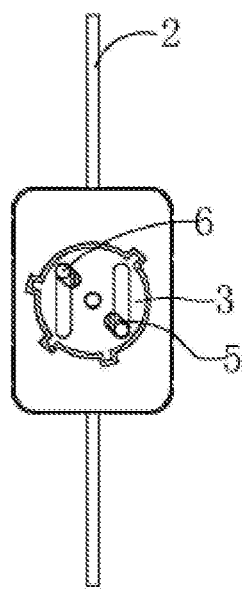
FIG. 5 is a third schematic view of the linear movement of the elongate metal lock bar when the turntable is rotated according to the first embodiment.

In one example, the linear conversion mechanism includes a first circular projection 6 located on an upper surface of the rearward extending portion 42. An elongate radially extending slot 5 is provided at an eccentric or off-centre position of the turntable 3, and the first circular projection 6 is received in the elongate slot 5. As shown in FIGS. 3 to 5, when the turntable 3 rotates around the central axis of rotation, the elongate slot 5 on the turntable 3 applies a force to the first circular projection 6 on the rearward extending portion 42 which drives the connecting member 4 to perform a linear movement in the longitudinal direction of the elongate metal lock bar 2. In this manner, the elongate slot 5 on the turntable 3 has a circular arc-shaped motion trajectory and the first circular projection 6 has a motion trajectory consistent with a linear trajectory of the elongate metal lock bar 2.

Figure 9:
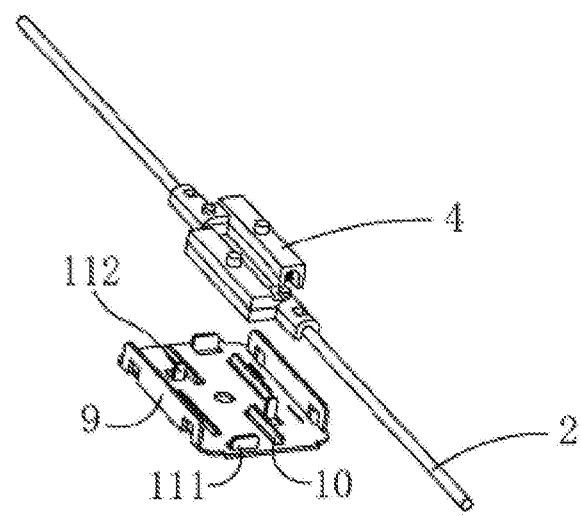
FIG. 9 is a first structural schematic view of a connecting member and a metal base plate.
Figure 10:
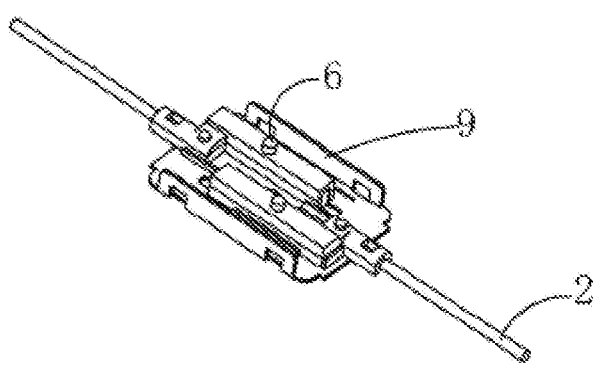
FIG. 10 is a second structural schematic view of the connecting member and the metal base plate.

As shown in FIGS. 9 and 10, the locking apparatus 1 further includes a generally rectangular metal base plate 9 mounted on the door body of the pet cage, for placing the elongate metal lock bar 2 and the connecting member 4 etc. The elongate metal lock bar 2 extends over an upper surface of the metal base plate 9 from a central position on a side of the metal base plate 9 improving the overall stability of the metal base plate 9. The connecting member 4 reciprocates linearly on the metal base plate 9.

According to conventional methods, the metal lock bar would be bent twice and then connected with the elongate slot 5 on the turntable 3. This bending process of the metal lock bar can be difficult to achieve. Further, movement of a round metal lock bar is not very stable. In this example, the connecting member 4 of the present disclosure is integrally injection molded from a plastic material, and the elongate metal lock bar 2 is connected to the turntable 3 through the connecting member 4 so that the bending process of the metal lock bar may be simplified and the reliability of the structure is enhanced.

In this illustrative embodiment, metal base plate 9 includes side abutment portions 10 for limiting sideways or lateral movement during linear movement of the connecting member 4 on the metal base plate 9 which in this example are formed by stamping the metal base plate 9. As can be seen in this example, a side surface of the connecting member 4 is a plane structure and is matched with the side abutment portion 10.

Additionally, in this example, end abutment portions 11 are provided on the metal base plate 9, and the end abutment portions 11 are formed by stamping on the metal base plate 9. Two end abutment portions 11 are provided correspondingly to one connecting member 4, a first end abutment portion 111 being located at the front end of the rearward extending portion 42, and a second end abutment portion 112 being located at the rear end of the rearward extending portion 42. The provision of the first end abutment portion 111 and the second end abutment portion 112 both function to limit the magnitude of the linear movement of the rearward extending portion 42 on the metal base plate 9. As a result, the elongate metal lock bar 2 is confined to linear motion trajectory on the metal base plate 9.

Figure 11:
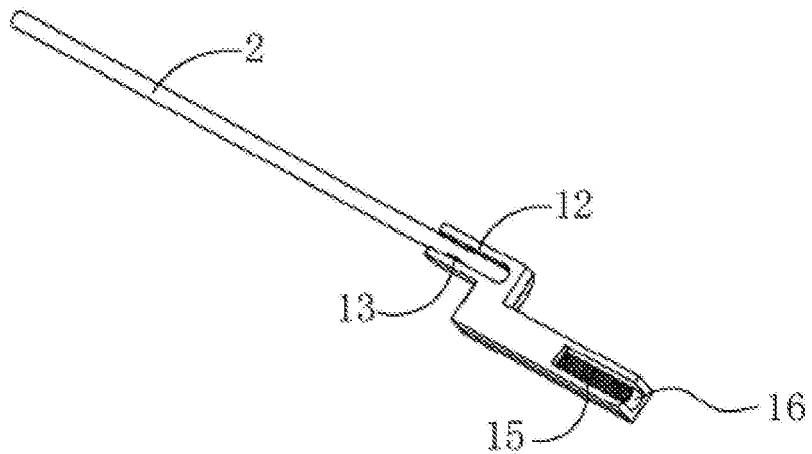
FIG. 11 is a first structural schematic view of a spring in a rearward extending portion of the connecting member.
Figure 12:
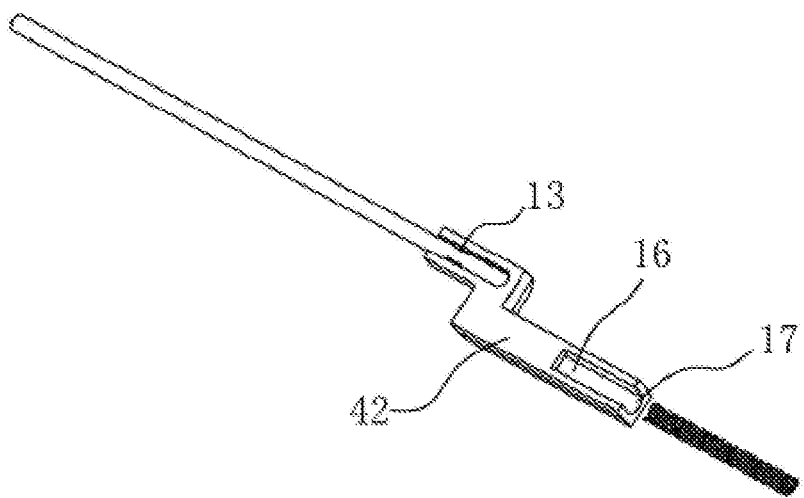
FIG. 12 is a second structural schematic view of the spring in a rearward extending portion.
Figure 13:
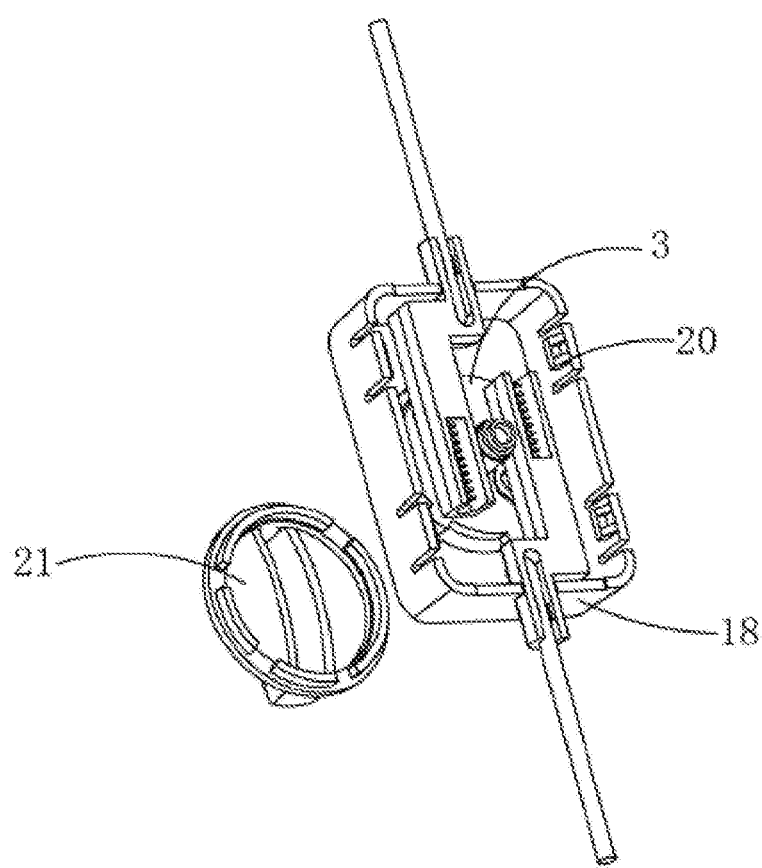
FIG. 13 is an underside structural schematic view of a locking apparatus for a pet cage.

Additionally, as shown in FIGS. 11 to 13, rearward extending portion 42 of connecting member 4 comprises an open-ended 17 U-shaped channel 16 for receiving a spring 15. The opposed end of U-shaped channel 16 is closed and provides a stop against a first received end of the spring 15 and the free end of spring 15 abuts the second end abutment portion 112 on the metal base plate 9. As shown in FIG. 10, the shape of the second end abutment portion 112 matches the cross sectional shape of the U-shaped channel 17. When the rearward extending portion 42 is moved rearward, the second end abutment portion 112 compresses the spring 15 and is received into the U-shaped channel 17 and the spring provides a return force to urge the connecting member 4 forward.

In operation, the turntable 3 is manually turned via a button 21, and the elongate slot 5 on the turntable 3 drives the first circular projection 6 on the rearward extending portion 42 so that the rearward extending portion 42 and the elongate metal lock bar 2 are moved backward. At this time, the spring 15 is compressed, the elongate metal lock bar 2 is moved backward and then moved out of a lock hole located on the body of the pet cage and the door body may be opened. At this time, small animals in the pet cage can be taken out or put in.

When button 21 is released, the connecting member 4 and the elongate metal lock bar 2 are both moved forward under the elastic action of the spring 15. Therefore, when it is necessary to close the door body, the turntable 3 is also first rotated so that the spring 15 is in a compressed state. Thereafter, when an outer end of the elongate metal lock bar 2 is aligned with the lock hole of the cage body, the turntable 3 is released. As a result, the restoring force of the spring 15 will ensure that the elongate metal lock bar 2 is inserted into the lock hole of the cage body and the door body is locked by the locking apparatus.

As shown in FIGS. 11 and 12, a first groove 12 for containing the elongate metal lock bar 2 is provided on a lower side of the forwardly extending portion 41, and a limit rib 13 for limiting the up-and-down movement of the elongate metal lock bar 2 is provided on two sidewalls of the first groove 12. A through hole 14 is provided on an inner end of the forwardly extending portion 14. As shown in FIG. 2, an inner end of the elongate metal lock bar 2 is bent at 90 degrees to form a force receiving end 211 which is hooked in the through hole 14. When the connecting member 4 performs a linear reciprocating movement, the elongate metal locking bar 2 hooked in the through hole 14 is also driven to reciprocate linearly. Limit rib 13 functions to prevent the elongate metal lock bar 2 from falling out of the connecting member 4.

Figure 17:
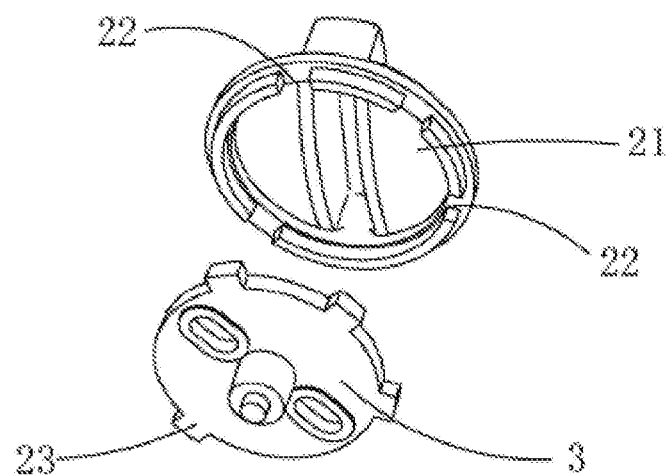
FIG. 17 is a disassembled view of the turntable and a button in the first embodiment.
Figure 18:
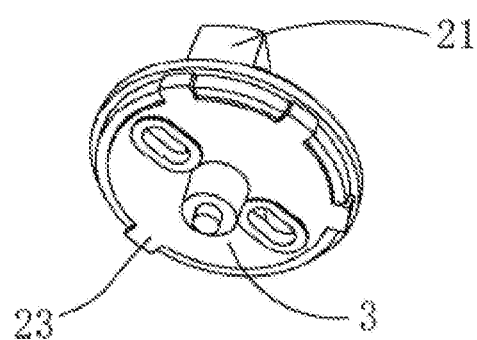
FIG. 18 is an assembled view of the turntable and the button in the first embodiment.

As shown in FIG. 13, a lower end of the turntable 3 is mounted on the metal base plate 9, and a housing 18 is mounted on the metal base plate 9. As shown in FIG. 2, the metal base plate 9 and the housing 18 are fixed to each other by a first snap fit arrangement. The first snap fit arrangement includes a first connection aperture 19 provided on the metal base plate and a first resilient lug or projection 20 on the housing 18. A button or knob 21 for driving the turntable 3 to rotate is provided on the centre of the housing 18. As shown in FIGS. 17 and 18, the button or knob 21 and the turntable 3 are attached together by a second snap fit arrangement which comprises peripheral slots 22 located on the button 21 that receive and attach to corresponding protrusions 23 on the turntable 3.

As would be appreciated, the locking apparatus 1 for a pet cage as provided with the housing 18 is more integrated and has a more compact appearance and the further provision of the button 21 allows the user to open and lock the door body more conveniently and ergonomically.

Second Embodiment

Figure 19:
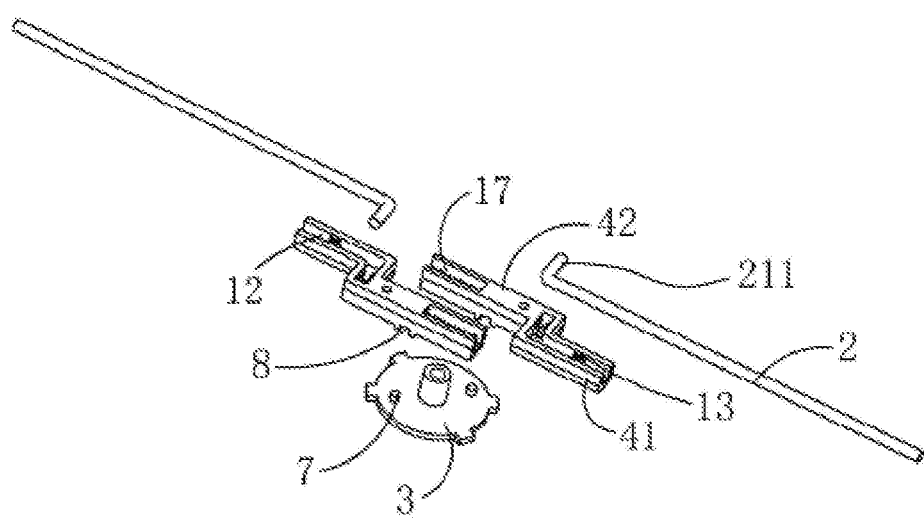
FIG. 19 is a disassembled view of the turntable and the connecting member in the second embodiment.
Figure 20:
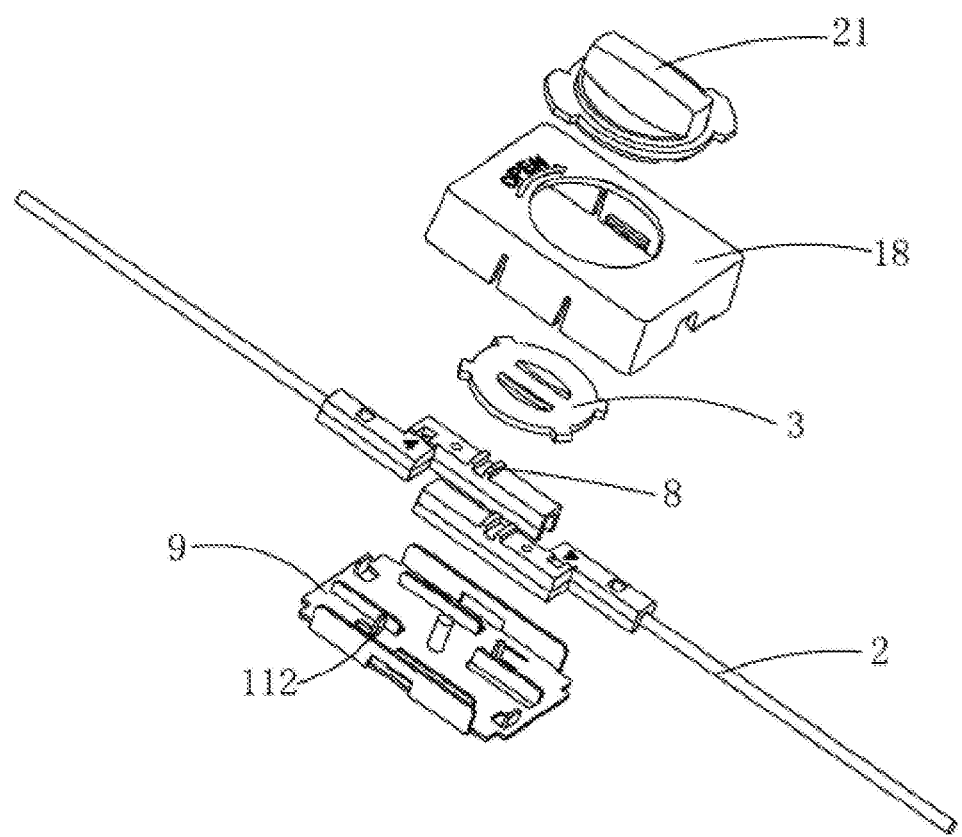
FIG. 20 is a disassembled view of a pet cage locking apparatus in the second embodiment.

Other parts of the present embodiment are the same as those of the first embodiment except that in this illustrative embodiment as shown in FIG. 19 and FIG. 20, the linear conversion mechanism may also include a transverse groove 8 located on the rearward extending portion 42 and extending perpendicular to a longitudinal direction of the rearward extending portion 42 and a second circular projection 7 located at an eccentric or off-centre position on the turntable 3 where the second circular projection 7 is located in the transverse groove 8.

Figure 6:
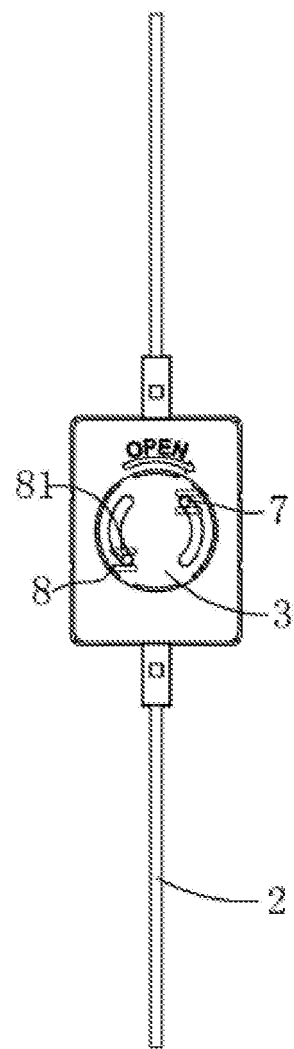
FIG. 6 is a first schematic view of a linear movement of a elongate metal lock bar when a turntable is rotated according to a second embodiment.
Figure 7:
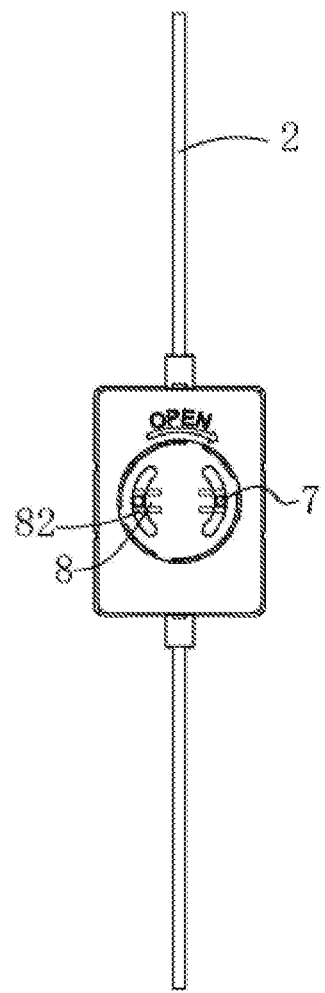
FIG. 7 is a second schematic view of the linear movement of the elongate metal lock bar when the turntable is rotated in the second embodiment.
Figure 8:
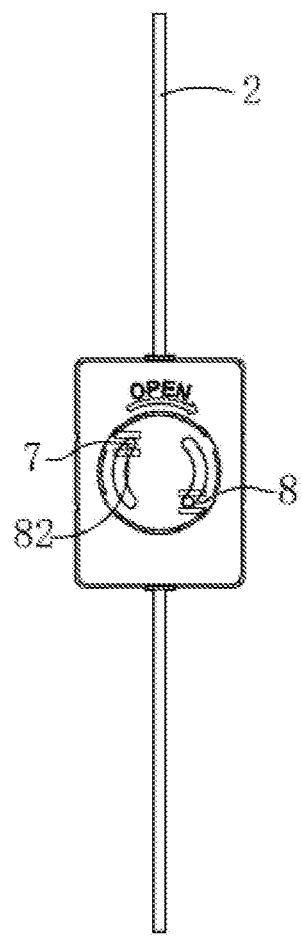
FIG. 8 is a third schematic view of the linear movement of the elongate metal lock bar when the turntable is rotated according to the second embodiment.

In this embodiment, the transverse groove 8 includes a groove front wall 81 and a groove rear wall 82; and as shown in FIGS. 6 to 8, the second circular projection 7 of the turntable 3 is located in the transverse groove 8 of the rearward extending portion 42. The process of opening the door body is exemplified as follows: the turntable 3 is manually rotated via the knob or button 21 and the second circular projection 7 on the turntable 3 applies a compressive force on the groove rear wall 81 of the transverse groove 8 to drive the rearward extending portion 42 and the elongate metal lock bar 2 to move backward together. At this time, the spring 15 is compressed and the elongate metal lock bar 2 is moved out of the lock hole of the cage body, and the door body of the pet cage may be pulled open.

In this process, the motion trajectory of the second circular projection 7 on the turntable 3 is arc-shaped, and the motion trajectory of the transverse groove 8 is linear. When the hand leaves the button 21, the elastic force of the spring 15 causes the rearward extending portion 42 and the elongate metal locking bar 2 to move forward together. The groove rear wall 81 of the transverse groove 8 urges the turntable 3 to reset by pushing the second circular projection 7.

Figure 14:
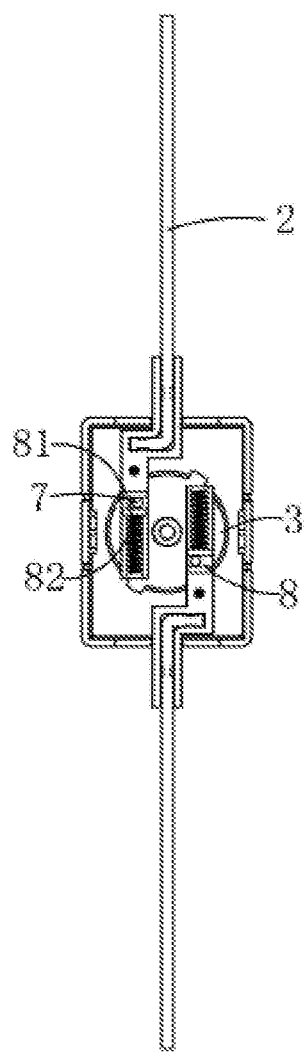
FIG. 14 is a first schematic view of the linear motion of the spring when the turntable is rotated in the second embodiment.
Figure 15:
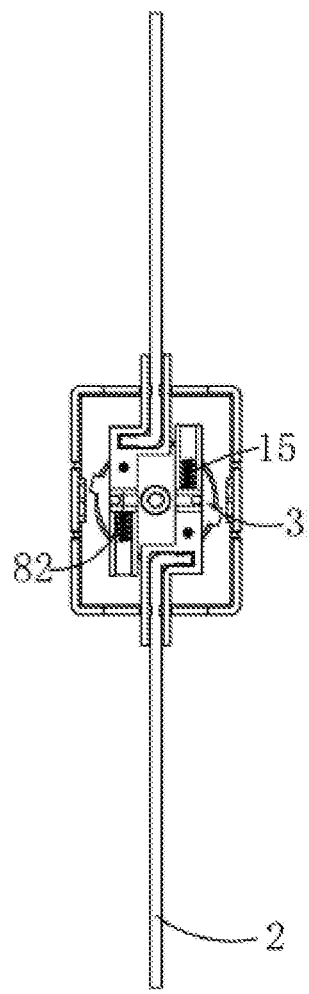
FIG. 15 is a second schematic view of the linear motion of the spring when the turntable is rotated in the second embodiment.
Figure 16:
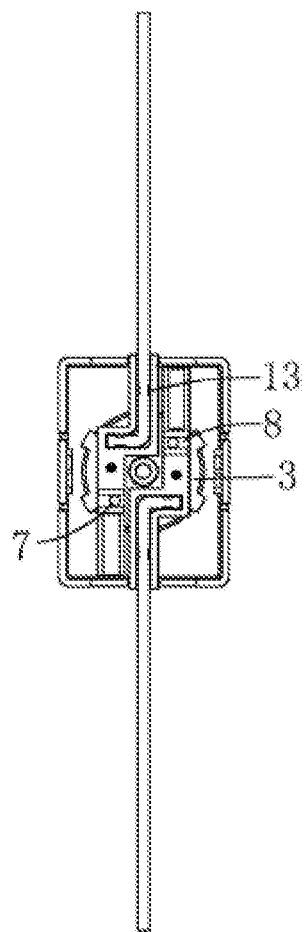
FIG. 16 is a third schematic view of the linear motion of the spring when the turntable is rotated in the second embodiment.

As shown in FIGS. 14 to 16, when the turntable 3 is manually rotated via the button 21, the second circular projection 7 on the turntable 3 is always moved in the transverse groove 8, and the second circular projection 7 applies a force acting on the groove rear wall 81 of the transverse groove 8 in a direction perpendicular to the groove rear wall 81, that is, the direction of the force is the same as the movement direction of the rearward extending portion 42, which ensures that the force is not decomposed and sufficiently acts on the rearward extending portion 42.

As a result, the button 21 may be manually rotated more easily and smoothly. In this regard, the second embodiment has some advantages relative to the first embodiment. In the first embodiment, the elongate slot 5 on the turntable 3 and the first circular projection 6 on the rearward extending portion 42 are in a working relationship, and the direction of the force acting on the first circular projection 6 by an inner wall of the elongate slot 5 and the movement direction of the rearward extending portion 42 are not necessarily coincident with each other at all times. Therefore, the locking apparatus of the second embodiment may be easily operated with less effort.

In this embodiment, the forwardly extending portion 41 of connecting member 4 comprises a first channel 12 for receiving the elongate metal lock bar 2 where the first channel is located on a lower side of the forwardly extending portion 41. The first channel 12 comprises limit ribs 13 for limiting the up-and-down movement of the elongate metal lock bar 2 and which are located on two sidewalls of the first channel 12. Forwardly extending projection 41 further includes a through hole 14 located on an inner end.

The retained end of the elongate metal lock bar 2 is bent at 90 degrees to form a force receiving end 211 which may be inserted in through hole 14. The shape of the first channel 12 and through hole 14 matches with that of the elongate metal lock bar 2 after being bent at 90 degrees. When the force receiving end 211 is contained in the first channel 12, it is also fixed by the limit rib 13. On assembly, when the connecting member 4 linearly reciprocates on operation of button 21, the elongate metal lock bar 2 which is confined within the first groove 12 is similarly caused to linearly reciprocate.

As shown in FIGS. 14 to 16, when the locking apparatus is used, the turntable 3 is rotated around its axis of rotation by rotating the button 21, the second circular projection 7 on the turntable 3 is constrained to move in the transverse groove 8, and the direction of the force applied by the second circular projection 7 on the groove rear wall 81 of the transverse groove 8 is perpendicular to the groove rear wall 81, resulting in the rearward extending portion 42 and the spring 15 contained in the U-shaped groove 17 moving backwards together. The spring 15 is gradually compressed due to being compressed by the second end abutment portion 112 until the second end abutment portion 112 stops at the distal end of the U-shaped groove 17.

At this time, the elongate metal lock bar 2 is completely moved out of the lock hole of the cage body and small animals may be taken out or put in by opening the door body. When the button 21 is released, the elastic force of the spring 15 causes the rearward extending portion 42 and the elongate metal locking bar 2 to move forward together. As a result, the groove rear wall 81 of the transverse groove 8 urges the turntable 3 to reset by pushing the second circular projection 7.

When it is necessary to close the door body, the turntable 3 is first rotated so that the spring 15 is in a compressed state. Thereafter, when the outer end of the elongate metal lock bar 2 is aligned with the lock hole of the cage body, the turntable 3 is released. As a result, the restoring force of the spring 15 will cause the elongate metal lock bar 2 to be inserted into the lock hole of the cage body and the door body is locked by the locking apparatus.

As would be appreciated by those of skill in the art, a locking apparatus in accordance with the present disclosure includes as an advantage that rotating the turntable around its centre point results in the simultaneous linear movement of the one or more elongate metal bars to cause the locking or opening of the door body. This arrangement is very convenient and ergonomic to operate and effectively locks the door body to the cage body as has been described above.

In addition, the configuration of the connecting member provides an arrangement where a pair of elongate metal lock bars can extend in opposed directions from the centre of the locking apparatus with respect to the turntable and this configuration provides improved stability of the locking apparatus as the forces are balanced. Another advantage is that connecting the elongate metal lock bar to the connecting member does not require multiple bends in the elongate metal lock bar.

Various embodiments of locking apparatus and the pet cage in accordance with the present disclosure are described in detail above. Herein, the principle and embodiments of the present disclosure have been described by using specific examples. The above description of the embodiments is only to help understand the present disclosure and its principles. It should be noted that some improvements and modifications to the present disclosure made be made for those skilled in the art without departing from the principle of the disclosure. These improvements and modifications also fall within the protection scope of the claims.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A locking apparatus for a pet cage, comprising:
   a turntable rotatable about a central axis of rotation;
   at least one elongate metal lock bar, said elongate metal lock bar configured to extend along a radial line originating from the axis of rotation of the turntable;
   a connecting member for operably connecting the elongate metal lock bar and the turntable; the connecting member comprising:
      a forwardly extending portion for receiving a front section of the elongate metal lock bar and fixing a retained end of the elongate metal lock bar to the connecting member; wherein the forwardly extending projection of the connecting member comprises a first channel for receiving the elongate metal lock bar, the first channel located on a lower side of the forwardly extending portion, and wherein the first channel comprises limit ribs located on side walls of the first channel, the limit ribs configured for limiting up-and-down movement of the elongate metal lock bar, and wherein the forwardly extending projection further includes a through hole located on an inner end of the forwardly extending projection, the through hole configured to receive and fix the retained end of the elongate metal lock bar that has been bent at 90 degrees with respect to the remaining elongate metal lock bar; and
      a rearward extending portion which extends parallel with and is outwardly offset from the forwardly extending portion; and
      a linear conversion mechanism arranged between the turntable and the rearward extending portion of the connecting member; the linear conversion mechanism configured to convert rotation of the turntable about the axis of rotation to linear movement of the connecting member in the same direction as a longitudinal direction of the elongate metal lock bar.

2. The locking apparatus according to claim 1, wherein said linear conversion mechanism includes:
   a first circular projection located on an upper surface of the rearward extending portion, and
   an elongate slot located eccentrically on said turntable, wherein the circular projection is received within the elongate slot.

3. The locking apparatus according to claim 1, wherein said linear conversion mechanism includes:
   a transverse groove located on the rearward extending portion and extending perpendicularly to a longitudinal direction of the rearward extending portion; and
   a second circular projection located at an eccentric position on said turntable, wherein the second circular projection is located in said transverse groove.

4. The locking apparatus according to claim 1, further comprising a generally rectangular metal base plate for mounting on a door body of a pet cage, wherein said elongate metal lock bar extends over an upper surface of the metal base plate from a central position on a side of the metal base plate and said connecting member reciprocates linearly on said metal base plate.

5. The locking apparatus according to claim 4, wherein the metal base plate comprises two side abutment portions for limiting sideways movement of said connecting member, wherein said side abutment portions are formed by stamping the metal base plate.

6. The locking apparatus according to claim 4, wherein the metal base plate comprises first and second end abutment portions for limiting linear movement of said rearward extending portion on the metal base plate, wherein the first end abutment portion is located at a front end of said rearward extending portion and the second end abutment portion is located at a rear end of said rearward extending portion, wherein said first and second end abutment portions are formed by stamping of the metal base plate.

7. The locking apparatus according to claim 4, wherein the rearward extending portion comprises an open-ended U-shaped channel for receiving a spring, the U-shaped channel closed at an opposed end to provide a stop against a received end of the spring and wherein a free end of the spring abuts a second end abutment portion located on the metal base plate, the second end abutment portion configured to match the shape of the U-shaped channel so that when the connecting member moves rearward the second end abutment portion compresses the spring and is received into the U-shaped channel and the spring provides a return force to urge the connecting member forward.

8. The locking apparatus according to claim 4 wherein a lower end of said turntable is rotatably mounted on said metal base plate; a housing is mounted on said metal base plate; said metal base plate and the housing are fixed together by a snap fit arrangement, and a button or knob for driving said turntable to rotate is provided on a centre of said housing.

9. A pet cage, comprising a cage body, said pet cage comprising a door body formed by grid metal strips, the door body including a locking apparatus according to claim 1 to lock the door body to the cage body.

* * * * *